(12) United States Patent
Mush et al.

(10) Patent No.: US 8,078,643 B2
(45) Date of Patent: Dec. 13, 2011

(54) SCHEMA MODELER FOR GENERATING AN EFFICIENT DATABASE SCHEMA

(75) Inventors: Eyal Mush, Qiryat-Motzkin (IL); Ronen Cohen, Nahariya (IL); Anat Segal, Shelomi (IL)

(73) Assignee: SAP AG, Walldorf (DE)

( * ) Notice: Subject to any disclaimer, the term of this patent is extended or adjusted under 35 U.S.C. 154(b) by 384 days.

(21) Appl. No.: 11/563,637

(22) Filed: Nov. 27, 2006

(65) Prior Publication Data

US 2008/0126389 A1    May 29, 2008

(51) Int. Cl.
*G06F 7/00* (2006.01)
*G06F 17/00* (2006.01)

(52) U.S. Cl. ......... 707/802; 707/804; 707/805; 707/807
(58) Field of Classification Search .......... 707/802, 707/804, 805, 807
See application file for complete search history.

(56) References Cited

U.S. PATENT DOCUMENTS

| | | | |
|---|---|---|---|
| 5,717,924 A * | 2/1998 | Kawai ........................... | 707/102 |
| 5,963,943 A * | 10/1999 | Cummins et al. .............. | 707/10 |
| 6,618,727 B1 * | 9/2003 | Wheeler et al. ................. | 707/10 |
| 2003/0028370 A1 * | 2/2003 | Leffert ............................ | 704/10 |
| 2004/0054569 A1 * | 3/2004 | Pombo et al. .................... | 705/7 |
| 2005/0021533 A1 * | 1/2005 | Ayachitula et al. ........... | 707/100 |

* cited by examiner

*Primary Examiner* — Robert Timblin
*Assistant Examiner* — Mariela Reyes
(74) *Attorney, Agent, or Firm* — Buckley, Maschoff & Talwalkar LLC

(57) ABSTRACT

A schema modeler for generating an efficient database schema. Provides intelligent choices for schema structure, generates efficient schemas while minimizing the amount of experience required by a database designer. Architectural elements of a schema design are proposed based on field inputs such as field type or relationship. Schema information is manually entered or imported. Configured for structural compatibility and semantic compatibility checking on fields and relationships for data integrity due to nested structure denormalization, inspection of lookup tables that can hold an unlimited number of records, inspection of taxonomy defined on a non-main table, and inspection of the schema for the existence of a main table. Provide suggested field types or schema structures that allow for a more efficient schema to be generated. Field types may include qualifier, multi-lingual, calculation and may include family or attribute table suggestions as well. Generation of validations and data profiling ensure efficient results.

17 Claims, 12 Drawing Sheets

Figure 4

| | A | B | C | D | E | F |
|---|---|---|---|---|---|---|
| 1 | Customers | | | | | |
| 2 | | FieldName | | FieldType | Default | Country |
| 3 | | First Name | | Text | 50 | |
| 4 | | Second | | Text | 50 | |
| 5 | | house number | | Text | 50 | |
| 6 | | Country | | Lookup [Flat] | Countries | |
| 7 | Customers | | | | | |
| 8 | Customers | | | | | |
| | Customers | | | | | |
| | Customers | | | | | |

| | A | B | C | D | E | F |
|---|---|---|---|---|---|---|
| 243 | Material Master General Plant Data | QI_BY_CHARACTERISTICS | Inspect by Characteristics | 0..1 | xsd:string 1 | |
| 244 | Material Master General Plant Data | QI_CONTROL_LOT_CREATION | Control of Inspection Lot Creation | 0..1 | xsd:string 1 | |
| 245 | Material Master General Plant Data | QI_ENTER_SAMPLE_MANU | Enter the Sample Manually | 0..1 | xsd:string 1 | |
| 246 | Material Master General Plant Data | QI_SAMPLE_CALC_MANUAL | Trigger Sample Calculation Manually | 0..1 | xsd:string 1 | |
| 247 | Material Master General Plant Data | QUALITY_SCORE_PROCEDURE | Procedure for Calculating Quality | 0..1 | xsd:string 2 | |
| 248 | Material Master General Plant Data | AVERAGE_INSPECTION_TIME | Average Inspection Duration | 0..1 | xsd:decimal 3 0 | |
| 249 | Material Master General Plant Data | IND_100_PERCNT_INSPECT | Indicator: 100% Inspection | 0..1 | xsd:string 1 | |
| 250 | Material Master General Plant Data | DELIVERY_TERMS_REQUIR | Indicator: Technical Delivery Terms | 0..1 | xsd:string 1 | |
| 251 | Material Master General Plant Data | QM_AUTHORIZATION_GROUP | Material Authorization Group for | 0..1 | xsd:string 6 | |
| 252 | Material Master General Plant Data | REQUIRE_QUALITY_AGREE | Quality Assurance Agreement | 0..1 | xsd:string 1 | |
| 253 | Material Master General Plant Data | VENDOR_RELEASE_REQUI | Vendor Release Required for D | 0..1 | xsd:string 1 | |
| 254 | Material Master General Plant Data | CERTIFICATE_REQUIRED | Certificate Required | 0..1 | xsd:string 1 | |
| 255 | Material Master General Plant Data | CERTIFICATE_TYPE | Certificate Type | 0..1 | xsd:string 4 | |
| 256 | Material Master General Plant Data | ALLOWED_SCRAP_SHARE | Allowed Share of Scrap (Percent) | 0..1 | xsd:decimal 6 4 | |
| 257 | Material Master General Plant Data | MATERIAL_MASTER_3 | | 0..unbounded | | MATERIAL_MASTER_3 |
| 258 | Material Master General Storage Loca | MATERIAL_ID | Material Number | 0..1 | xsd:string 40 | |
| 259 | Material Master General Storage Loca | PLANT | Plant | 0..1 | xsd:string 20 | |
| 260 | Material Master General Storage Loca | STORAGE_LOCATION | Storage Location | 0..1 | xsd:string 20 | |
| 261 | Material Master General Storage Loca | CURRENT_PERIOD | Current Period / Month (Posting) | 0..1 | xsd:string 2 \d+ | |
| 262 | Material Master General Storage Loca | CURRENT_FISCAL_YEAR | Current Fiscal Year | 0..1 | xsd:string 4 \d+ | |
| 263 | Material Master General Storage Loca | CHECK_FOR_DELETION | Deletion Flag | 0..1 | xsd:string 1 | |
| 264 | Material Master General Storage Loca | CREATED_ON | Date on Which the Record was | 0..1 | xsd:date | |
| 265 | Material Master General Storage Loca | INVENTORY_BLOCKING_IND | Physical Inventory Blocking Ind | 0..1 | xsd:string 1 | |
| 266 | Material Master General Storage Loca | STOCK | Valuated Stock with Unrestricted | 0..1 | xsd:decimal 13 3 | |
| 267 | Material Master General Storage Loca | INVENTORY_INDICATOR | Physical Inventory Indicator for | 0..1 | xsd:string 1 | |
| 268 | Material Master General Storage Loca | STOCK_IN_TRANSFER | Stock in Transfer | 0..1 | xsd:decimal 13 3 | |
| 269 | Material Master General Storage Loca | STOCK_IN_INSPECTION | Stock in Quality Inspection | 0..1 | xsd:decimal 13 3 | |

SCHEMA MODELER FOR GENERATING AN EFFICIENT DATABASE SCHEMA

BACKGROUND OF THE INVENTION

1. Field of the Invention

Embodiments of the invention described herein pertain to the field of computer systems. More particularly, but not by way of limitation, one or more embodiments of the invention enable a schema modeler for generating an efficient database schema that is structurally and semantically correct and that provides rapid access to data.

2. Description of the Related Art

Schema modelers are generally monolithic applications that allow a database implementer to generate and modify entity relationship diagrams that represent the schema of the database. These applications do not however allow for the generation of efficient schemas to take advantage of the actual data that resides or will reside in a database. The efficiency of the database is left entirely to the experience level of the database designer at best. For example, once a schema has been generated, vast quantities of redundant data or inefficiently repetitive data may result based on the experience level of the implementer and the particular data that inhabits the database. Over time, the schema may be augmented by the database designer, or more likely a different database designer. The schema may be modified or patched in a simple manner to add additional fields. In this example, duplicative data may result that a separate lookup table would negate. Use of a different structure, although more work for the database designer during schema modification may save enormous amounts of memory and disk space. For example, sales prices for given quantities may be added over time in fields for a product table. When this occurs sparse data may result that makes for a very inefficient database. Although easy to add, each additional sparsely populated field taken as a whole makes for an inefficient schema.

Altering the schema of a working database is a dangerous proposition. One method to determine if a lookup table should be used for example, requires that a database be duplicated or a subset of that database be copied to another database server and modified. By modifying the schema and observing the size and performance changes that result, a database designer or database administrator may decide that a change in the basic architecture of the schema is warranted. This trial and error approach is time consuming and costly and relies entirely on the experience level of the database designer.

For at least the limitations described above there is a need for a schema modeler for generating an efficient database schema.

BRIEF SUMMARY OF THE INVENTION

One or more embodiments of the invention are directed to a schema modeler for generating an efficient database schema. By providing a database designer with intelligent choices for schema structure, embodiments of the system generate efficient schemas while minimizing the amount of experience required by a database designer. Architectural elements of a schema design are proposed by one or more embodiments of the invention based on field inputs such as field type or field relationship. Schema information such as field inputs may be manually entered or may be imported from an external data source. In one or more embodiments of the invention, extensible markup language schema definition (XSD) may be utilized to import a schema from an external data source. Any other schema language may be utilized by the apparatus however.

Embodiments of the invention are generally configured for structural compatibility and semantic compatibility checking. Rule-based structural and semantic checking is employed to check the fields and relationships for data integrity due to nested structure denormalization, inspection of lookup tables that can hold an unlimited number of records, inspection of taxonomy defined on a non-main table, and inspection of the schema for the existence of a main table. By analyzing the fields and relationships between the fields, embodiments of the invention may be configured to provide suggested field types or schema structures that allow for a more efficient schema to be generated. Example field types that may be suggested include but are not limited to qualifier, multi-lingual and/or calculation or lookups based thereon. In addition, embodiments of the invention may also accept or suggest alternate schema structures that include family or attribute tables to augment a particular table.

Field types may be displayed in a list view for user selection or as part of an entity relation diagram or a menu or pull-down list for example in an entity relationship diagram. When the field type has been accepted by the apparatus any changes in a list view or entity relationship diagram is updated on the alternate view, such that any list view change is displayed on the entity relationship diagram and vice versa.

The apparatus may also be configured to provide and/or create validation code based on one or more fields or legal values for the field(s). In addition to structural and semantic checks, embodiments of the invention may be configured to conduct data profiling to validate a schema against sample data taken or derived from an external data source. Data profiling is used to further check for structural and semantic problems in addition to table and field conflicts and data integrity correctness. The schema is generated using the accepted fields (types and/or relationships and/or schema architecture) and loaded into a desired database. Custom field data types may be generated into standard SQL types, for example, a qualifier field type may result in the generation of SQL data definition commands that create appropriate lookup tables and relationships so that the user does not have to implement these types in an entity relationship view manually.

Field types that may be suggested include but are not limited to qualifier, multi-lingual and/or calculation or lookups based thereon. Qualifiers allow for sparse data to be eliminated from a table and placed in a separate table for example. Specifically, a qualified table is a special type of lookup table that is used to efficiently store complex relationships between a main table record and one or lookup table records. Qualifiers may be thought of as database "subfields" that apply to each association of a qualified table record with a main table record. Qualified tables offer for example, support for multiple prices such as various prices based on quantity. U.S. Pat. No. 6,938,038 filed Jun. 13, 2002 describes qualifiers that may be utilized using embodiments of the invention and is hereby incorporated herein by reference.

Multi-lingual fields allow for efficient storage of language, region, cultural and regulatory specific data associated with an "audience". This type of information is referred as multi-audience data herein. Through inheritance, not all multi-audience data for each supported audience is required to be entered. For example, only data that is different with respect to two supported audiences is entered, e.g., the word "tyre" may be replaced by "tire" if the audience viewing the data is targeted as "English[US]". If on the other hand, the targeted audience is based in the United Kingdom, then the audience specific data returned is "tyre". If the database contains thousands of language specific items for "English[UK]" and only a few dozen differ between "English[US]" and "English[UK]", then only those data elements that differ may be entered. Inheriting values from another audience enables the minimum amount of data to be entered and maintained. U.S. patent application Ser. No. 11/141,985 filed May 31, 2005 describes multi-lingual features that may be utilized with embodiments of the invention and is hereby incorporated herein by reference.

Calculation fields are virtual fields that are not held directly in the database, but rather are calculated when needed. Calculation fields are cached in memory during runtime and used by any data type. Hence any data type can use the calculated field as virtual data that is calculated. Because the calculated field is stored in memory at runtime and not in a database, the system is only required to recalculate the virtual filed by accessing memory rather than retrieving records from and writing records to the database. In instances where a change to a value impacts a significant number of other values, use of the virtual calculation field enables the system to avoid overhead intensive operations involved in accessing data from a database. One or more embodiments of the invention avoid re-calculating altogether by keeping a dirty bit identifying fields and attributes that need to be calculated based on a dependent data change for example. Calculation can then be performed at a later time when the desired data item is displayed or a sort operation occurs that uses the data item for example. Calculation fields aid in the processing of complex expression based validation. U.S. patent application Ser. No. 11/193,306 described calculations fields that may be utilized using embodiments of the invention and is hereby incorporated herein by reference.

In addition, embodiments of the invention may also accept or suggest alternate schema structures that include attribute and/or family constructs such as tables to augment fields in a given table.

Attributes are characteristics that apply to a subset of the records in a main table. Attributes are associated with, i.e., linked to main table records through a field value in each record. Attributes may be associated with a category value field such that each subset of records of a given category in a main table has an associated set of attributes that apply only to that subset of records. Attributes are hierarchical in that a given category acquires the attributes of any parent categories. Hence, a main table record includes the common fields, category-specific attributes and any inherited attributes. Alteration of attributes occurs in a separate table and does not require updates on main table records.

Family tables allow for additional layers that have a finer grain that the categories in a given taxonomy. For example when publishing product information, records often are better organized in a more granular structure than that provided by the categories, e.g., published by manufacturer as well as product category. Families are a subset of the main table records that are related by one or more common fields and/or attributes having the same value. In addition, a family may utilize "family data" that is held in a table other than the main data table that is specific to the family, such as images, logos, etc. Breaking the categories of a product table into finer subsets without altering the main data table allows for efficient publication and fast efficient searches. Since the families are defined based on values in the main data table fields or on attributes, a given group of records is only associated with one family. Families of records may inherit data from parent families. U.S. Pat. No. 6,910,044 describes family constructs that may be utilized in embodiments of the invention and is hereby incorporated herein by reference.

BRIEF DESCRIPTION OF THE DRAWINGS

The above and other aspects, features and advantages of the invention will be more apparent from the following more particular description thereof, presented in conjunction with the following drawings wherein:

FIG. 4 is a view of an operation on the "customers" table, namely to extend the table across defined fields by dragging the mouse.

FIG. 6 shows a view of an XSD-based schema imported data from an external database.

FIG. 7 shows a combined view of an XSD-based schema and a schema template.

DETAILED DESCRIPTION

A schema modeler for generating an efficient database schema will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

The brief summary of the invention provides information concerning field types that are utilized in one or more embodiments of the invention. For further information, see the patents and patent applications incorporated by reference in that section. Readers should note that one or more embodiments of the invention are used in various contexts and provide users with a way to conform a set of input data to a target schema. The target schema can vary but in at least one embodiment of the invention conforms to the requirements of SAP's Master Data Management (MDM) software solution. In modeling an MDM schema there are specific requirements that are MDM specific. For example, an MDM schema must typically have a main table, can make use of qualifiers, have multi-lingual values and/or have other MDM specific constraints.

Figure 1:
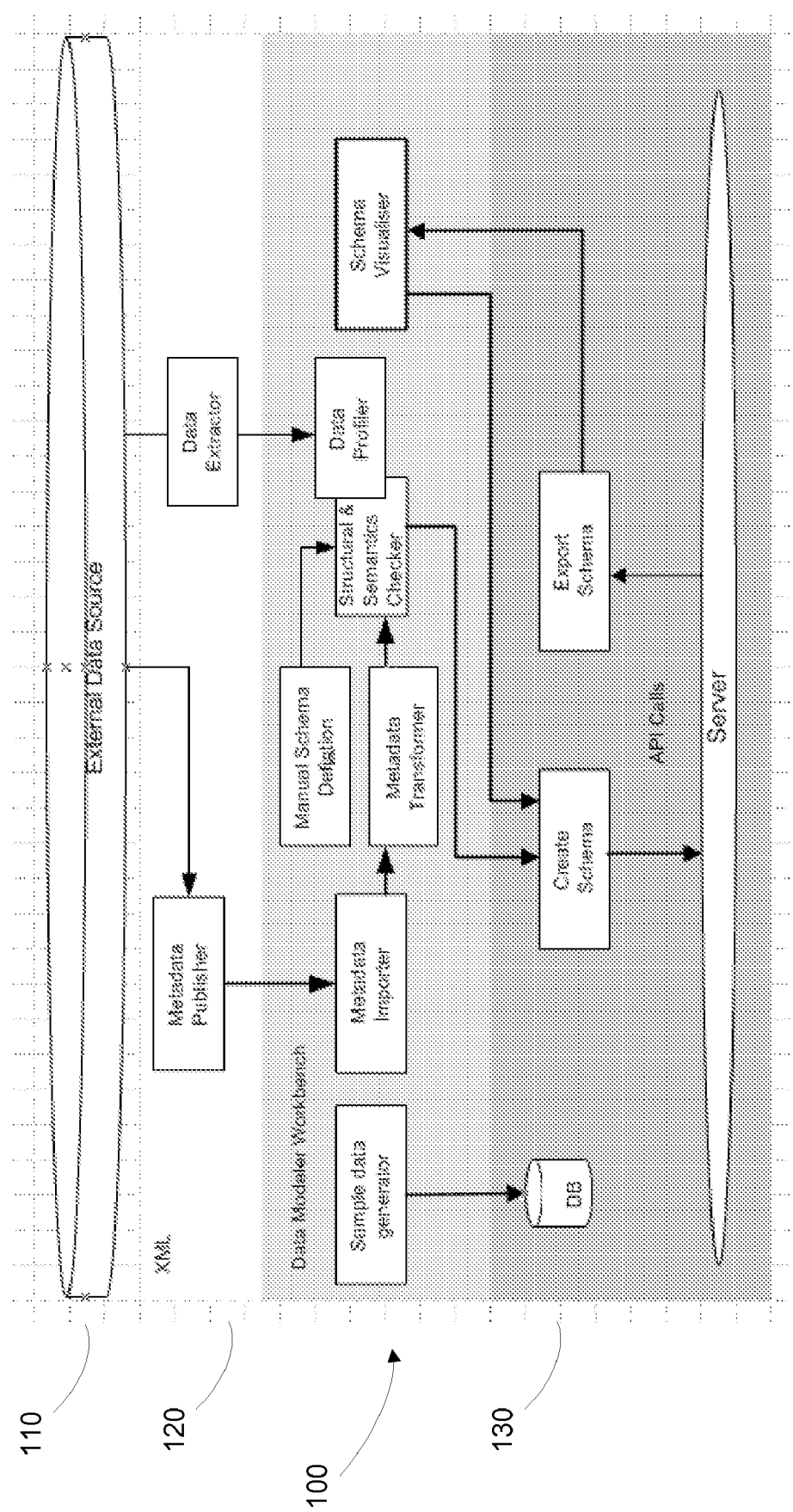
FIG. 1 is an architectural view of an embodiment of the invention.

FIG. 1 is an architectural view of an embodiment of the invention. Various components of this and other embodiments of the invention may be incorporated in a schema modeler computer program product for generating an efficient database schema comprising computer readable instruction code executing in a tangible memory medium of a computer and configured to perform functions described herein. External data source 110 may be utilized to import external schema and associated data. Alternatively, embodiments of the invention may be utilized to create a schema manually, without importing any other schema or data. XML layer 120 is utilized to interface to external data source 110 via XML. Although XML is shown in this figure it will be understood to one skilled in the art that any type of language or method of exchanging information without the use of XML is in keeping with the spirit of the invention. In one or more embodiments Extensible Mark Language Schema Definition (XSD) is utilized to provide data type information for the exported schema. XML layer 120 may include XML metadata and data as shown in the leftmost and rightmost blocks in XML layer 120. The components that make up embodiments of the invention are shown as Data Modeler Workbench 100. Data Modeler workbench is also referred to as schema modeler herein. The apparatus includes "Sample Data Generator" for generating sample data for use in manual schema definition projects or when importing schemas where data extraction is difficult or not possible. "Metadata Importer" is utilized to read in XML based schemas such as XSD formatted schemas. "Metadata transformer" takes the output of "Metadata Importer" and transforms the imported schema into a format used by the apparatus. Conversely, "Manual Schema Definition" is utilized when creating a new schema where no external data source schema exists. Regardless of the method utilized to obtain a schema, "Structural Semantics Checker" is utilized to ensure that all structural and semantic rules are enforced in any target schema. Specifically, structural compatibility and semantic compatibility is checked with at least one rule wherein the check includes inspection of data integrity due to nested structure denormalization, inspection of lookup tables that can hold an unlimited number of records, inspection of taxonomy defined on a non-main table and inspection of the existence of one main table. Any other structural or semantic test may be utilized in embodiments of the invention. "Data Profiler" is utilized to conduct data profiling to validate a schema against sample data derived from external data source 110 that includes checks for semantics, structural inconsistencies, table and field conflicts and data integrity correctness. "Schema visualizer" is utilized to display list view and/or entity relationship diagrams or any other type of schema viewing component capable of depicting a schema either via text or graphics or via any other media. Database layer 130 includes "DB" (the database), and "Create Schema" block that may be implemented as computer code to create a schema compatible with a desired database "DB". Database layer 130 also includes "Server" and an "Export Schema" block that may also be implemented as computer code to export a desired database schema. In this manner, the schema generated using schema modeler 100 may be read back in and modified as desired.

Figure 2:
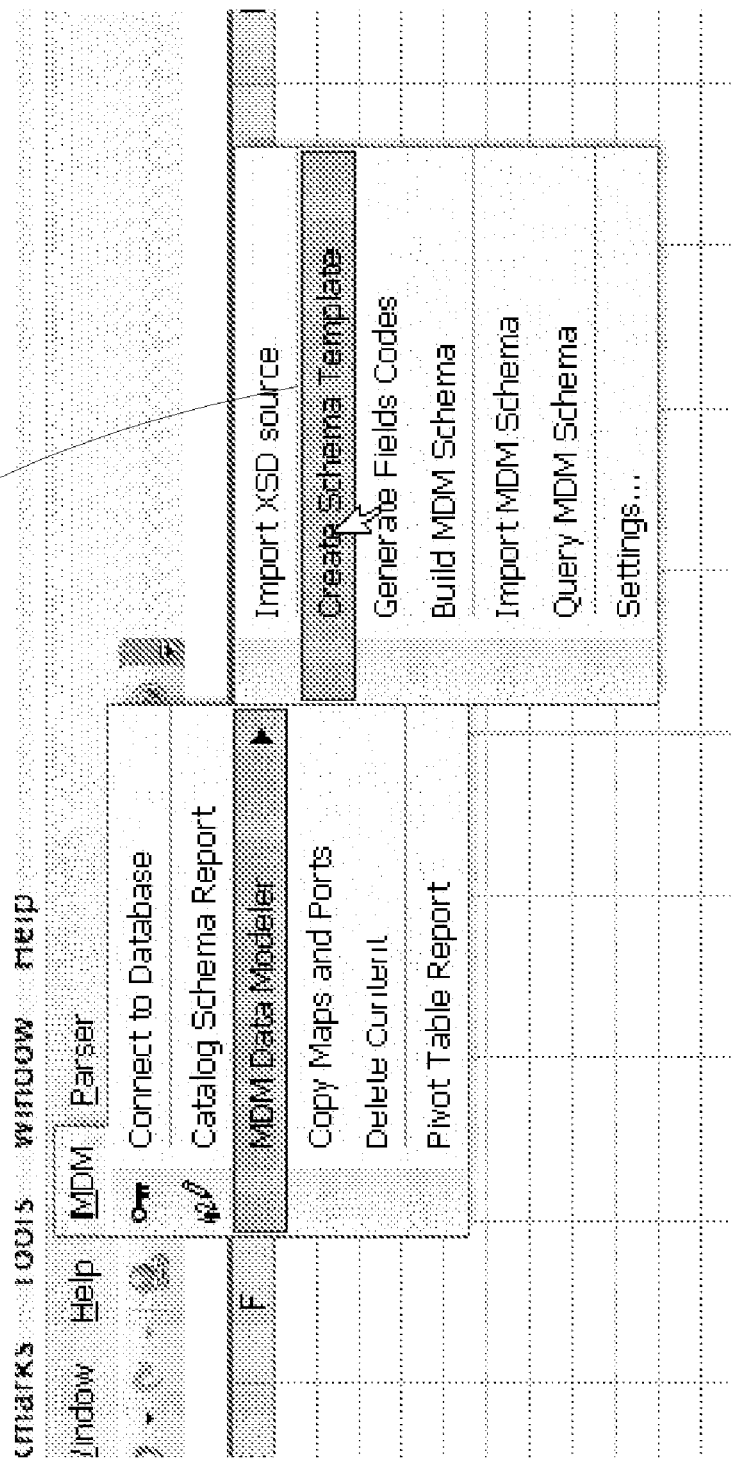
FIG. 2 is a view of a menu embedded into a spreadsheet program for accessing a command for creating a schema template.

FIG. 2 is a view of a menu embedded into a spreadsheet program for accessing a command for creating a schema template. "Create Schema Template" command 201 may be utilized to create a new template for manual input of a desired schema. Although the figure depicts the command as an add-on to an existing spreadsheet program, any method of exercising the functionality of the schema modeler 100 shown in FIG. 1 is in keeping with the spirit of the invention.

Figure 3:
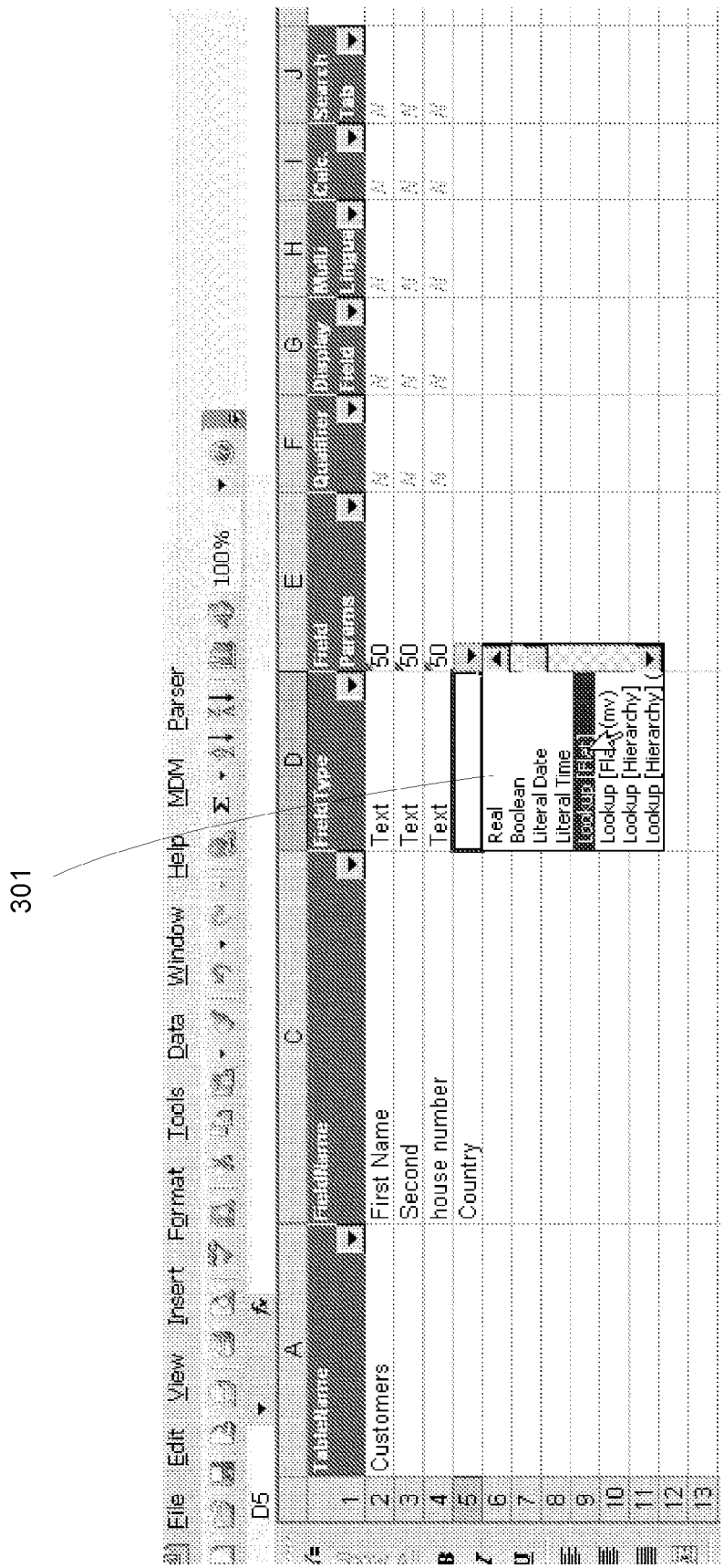
FIG. 3 is a view of the spreadsheet program utilized in the manual creation of a "customers" table.

FIG. 3 is a view of the spreadsheet program utilized in the manual creation of a "customers" table. In this figure, the "Field Type" for a given field is shown as a selectable pull-down list 301 that includes SQL and extend types utilized by embodiments of the invention. For example, the field type "lookup [Flat] (mv)" signifies a field type that is a lookup table type that is "flat" and that allows "mv" (multi-values) to be entered into a single field. Any of the custom fields shown below as well as any standard SQL field type may be suggested by an embodiment of the invention for a target schema. For example, if there are a series of fields that are sparsely populated and have similar text substrings, e.g., "qty 1-10", "qty 5-25", etc., then the apparatus may suggest that a qualified table be utilized to efficiently hold the sparse data. The following custom (non-standard SQL) types may be utilized in one or more embodiments of the invention:

TABLE 2

Field Data Types

| Field Data Type | MV | Description |
|---|---|---|
| Text Normalized | | Text field with "special" (non-alphanumeric) characters removed for searching/sorting (always displays original). |
| Name | | Text field with internal structure for storing parts of a name (prefix, first, middle, last, suffix). |
| Log | | Text Large field with internal structure for managing multiple timestamped blocks of text within a single field. |
| AutoID | | Integer field that MDME automatically increments. |
| Currency | | Real8 field displayed with a currency symbol. |
| Measurement | • | Real field with an associated unit of measure. |
| Date | | TimeStamp field that ignores the time part. |
| Time | | TimeStamp field that ignores the date part. |
| Create Stamp | | TimeStamp field that MDME automatically sets with the date and time of record creation. |
| Time Stamp | | TimeStamp field that MDME automatically updates with the date and time of modification when any of the fields being tracked are updated. |
| User Stamp | | Text field that MDME automatically updates with the name of the user who makes the change when any of the fields being tracked are updated. |
| Mask | • | Virtual field that stores an enumeration of main table records. It is never displayed but is used for searching. |
| Lookup [Flat] | • | Field whose value(s) are a lookup into a flat table. |
| Lookup [Hierarchy] | • | Field whose value(s) are a lookup into a hierarchy table. |
| Lookup [Taxonomy] | | Field whose single value is a lookup into a taxonomy table. |
| Lookup [Qualified] | • | Field whose values are a lookup into a qualified table. |
| Lookup [Image] | • | Field whose value(s) lookup into the Images table. |
| Lookup [Text Block] | • | Field whose value(s) lookup into the Text Blocks table. |
| Lookup [Text HTML] | • | Field whose value(s) lookup into the Text HTMLs table. |
| Lookup [PDF] | • | Field whose value(s) lookup into the PDFs table. |

TABLE 2

Attribute Data Types

| Attribute Data Type | MV | Corresponding MDME Field Type |
|---|---|---|
| Text | • | Lookup [Flat] |
| Numeric | • | Measurement |

TABLE 2-continued

Attribute Data Types

| Attribute Data Type | MV | Corresponding MDME Field Type |
|---|---|---|
| Coupled Numeric | • | n/a |

FIG. 4 is a view of an operation on the "customers" table, namely to extend the table across defined fields by dragging the mouse. Embodiments of the invention may take advantage of any computer program into which the embodiment is embedded. For example in this figure, the embodiment is configured to accept drag operations that apply a "Table Name" to multiple rows of the display, in this case to multiple fields in a table. Specifically, table name rows 301 are set to a table name of "Customers".

Figure 5:
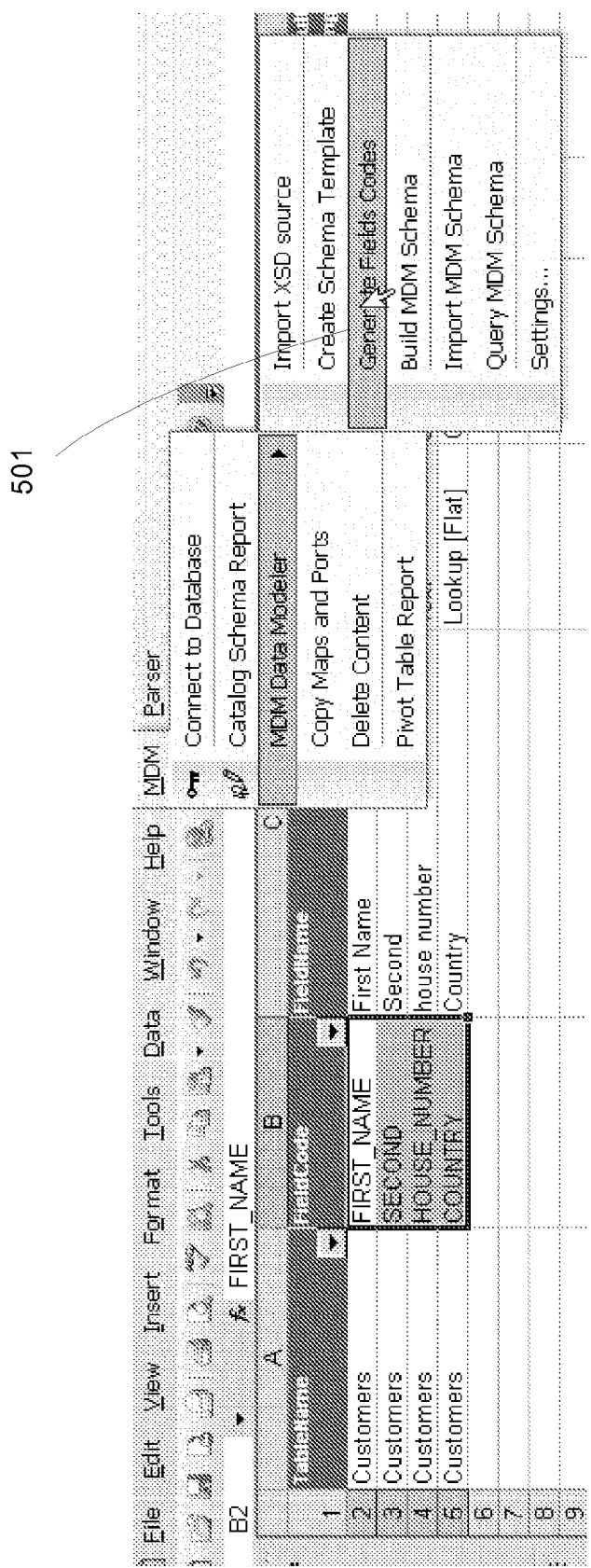
FIG. 5 is a view of an operation that generates standardized field codes for the defined fields in the table.

FIG. 5 is a view of an operation that generates standardized field codes for the defined fields in the table. Field codes that are standardized for a given target database may be generated using command 501. Any other operation used for generating schemas may also be incorporated into the menus of embodiments of the invention.

FIG. 6 shows a view of XSD-based schema imported data 601, imported from an external database. In this figure, column A shows the table name, column B shows the standardized field code, column C shows the field name, column D shows the cardinality of the relation and column E shows the XSD data type of the exported schema. The exported schema may be read in via "Metadata Importer" (see FIG. 1).

Figure 7:
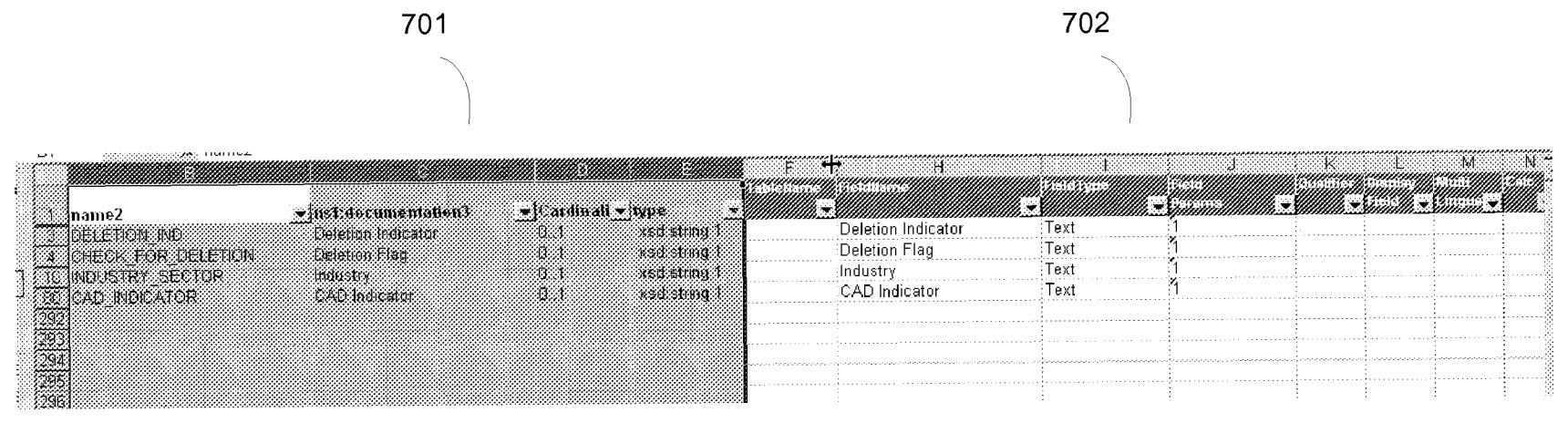

FIG. 7 shows a combined view of imported XSD-based schema 701 and target schema template 702. The schema read in via "Metadata Importer" may be shown for example on the left side of a list display. The target schema may be shown on the right side which includes the desired or suggested field types, field parameters, flags that signify if the field is to be a qualifier, multi-lingual or calculation type field. Any other method of showing the imported schema versus the target schema is in keeping with the spirit of the invention including but not limited to a dual entity relationship diagram or an entity relationship diagram that shows modifications in a different color for example. The fields are correlated and altered as per profiled or observed data to take advantage of sparse values for example.

Figure 8:
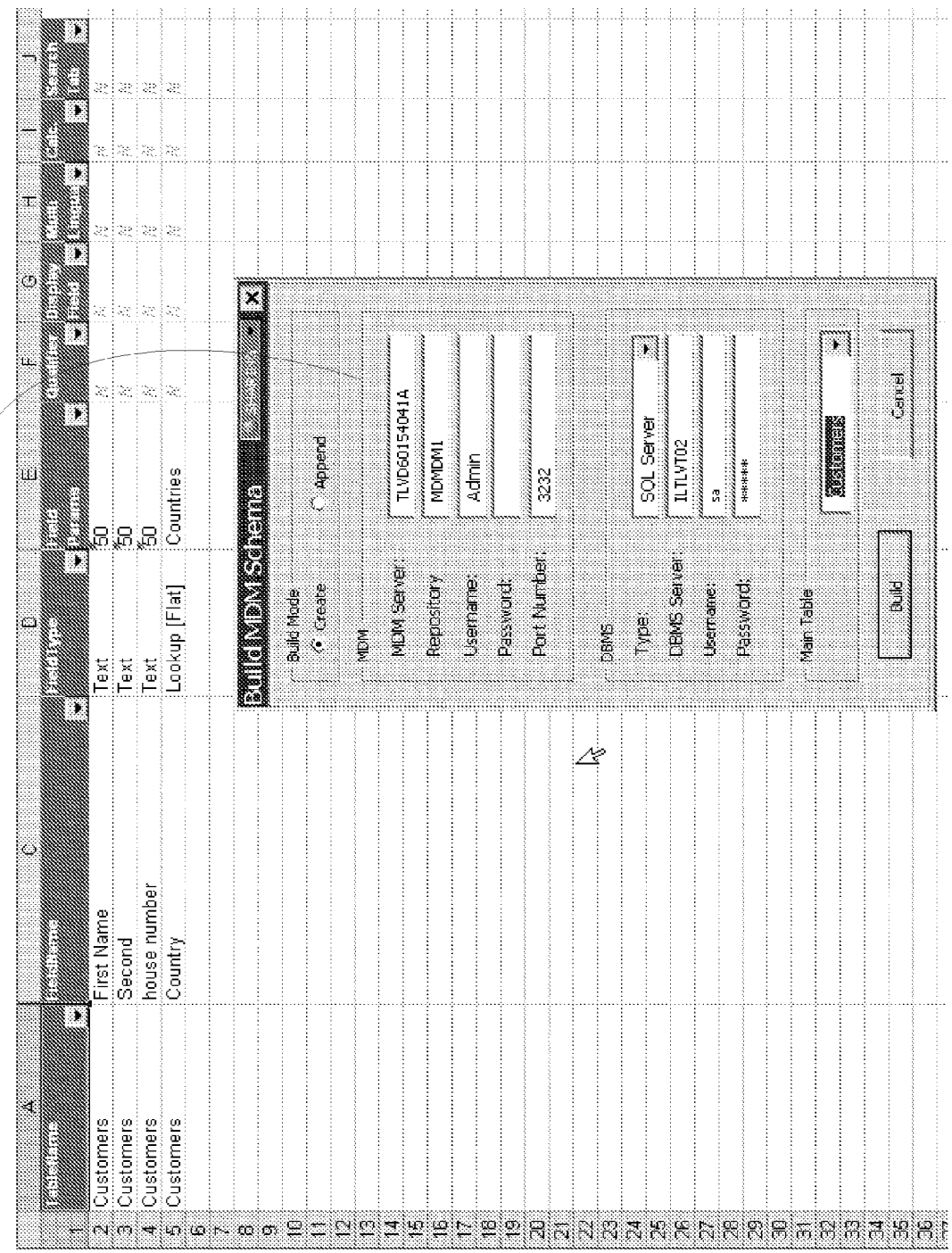
FIG. 8 is a view of a build schema operation that is used to perform structure and semantic checks and generate a schema.

FIG. 8 is a view of build schema operation menu 801 that is used to perform structure and semantic checks and generate a schema. Structural and semantic checks are performed on or before the "Build" button on the menu is selected. See the description of FIG. 1 for a description of the checks performed. Menu 801 further allows for the specification of the target server, repository, username, password and port in which to connect. Furthermore, the specific database parameters utilized are specified as shown in the lower portion of the menu. One or more embodiments of the invention generate or build schemas that utilize a "Main Table". The "Main Table" allows for certain special relations to be assigned to the table, for example a family based on a taxonomy in the table in the case of a product main table.

Figure 9:
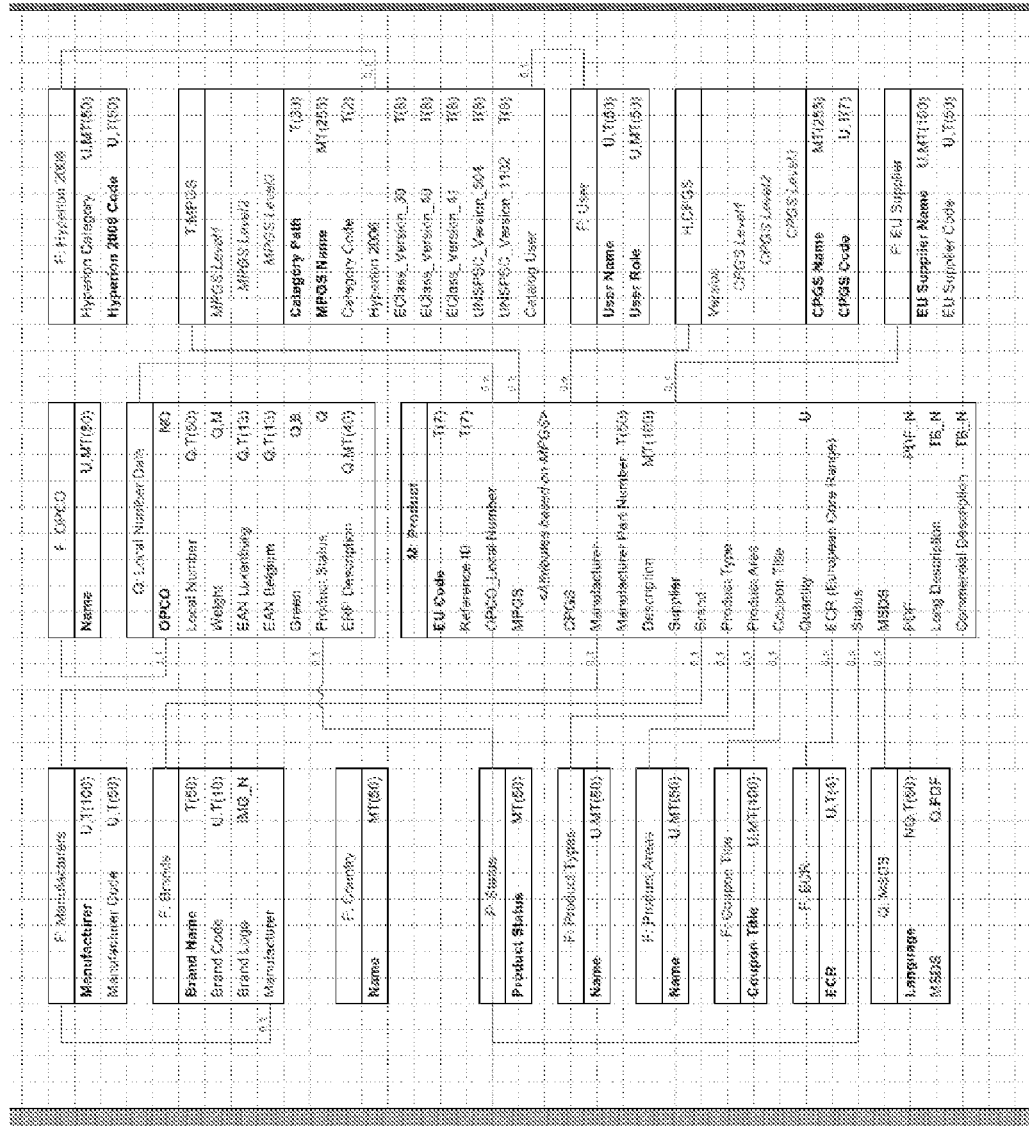
FIG. 9 is a view of an embodiment of an entity relationship diagram viewer component.

FIG. 9 is a view of an embodiment of an entity relationship diagram viewer component. Any change to this diagram is automatically updated in the list view as shown in FIG. 7 for example. The entity relationship diagram may utilize custom field types as listed in Table 1 or Table 2 above. In addition, the suggestion of a particular field type may be made by embodiments of the apparatus when the type of data or relationship of data in different fields is determined either programmatically or via querying the user.

Figure 10:
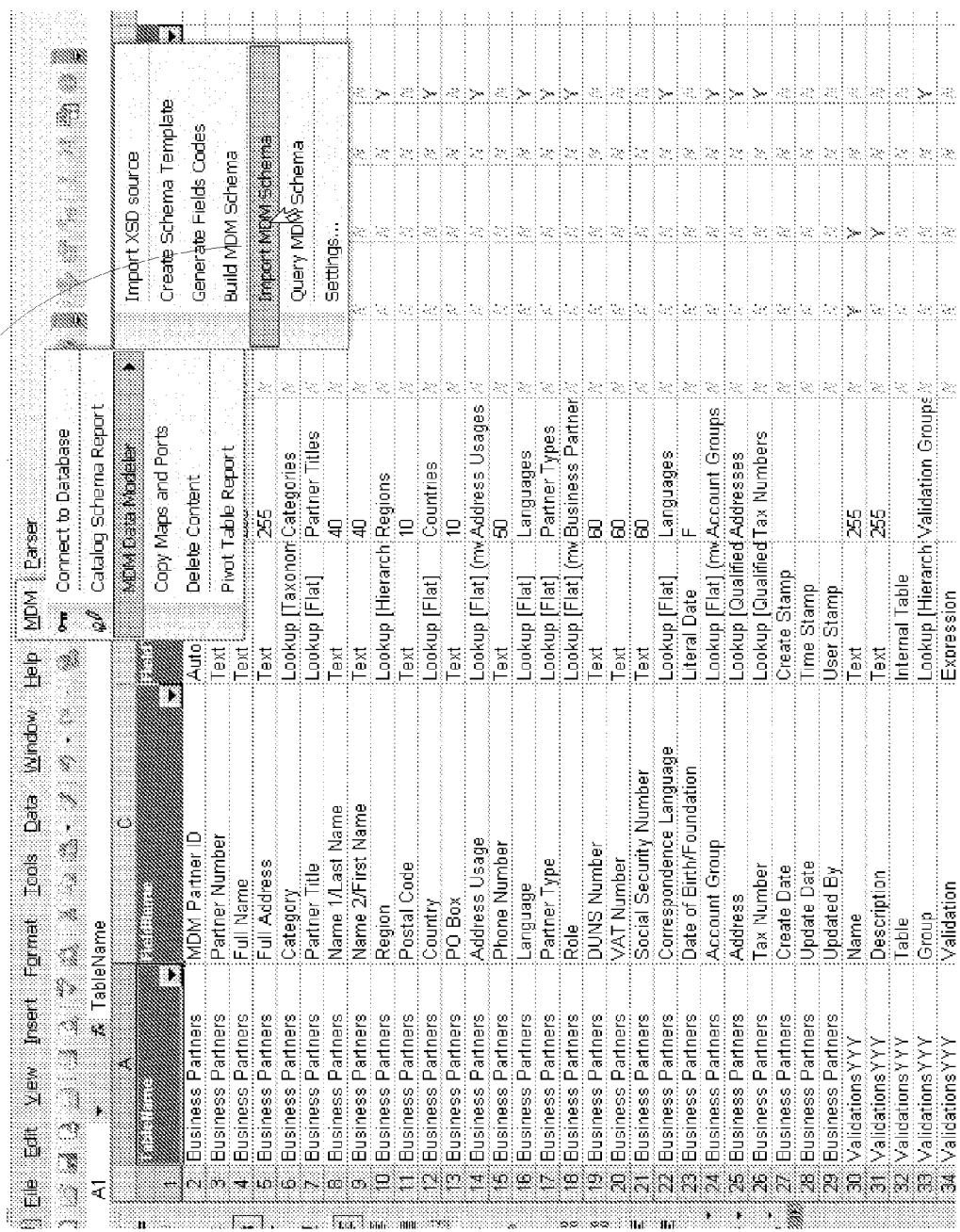
FIG. 10 is a view of an import schema command.

FIG. 10 is a view of import schema command 1001. Any other method of importing or accepting an import instruction from a user is in keeping with the spirit of the invention. The result of this command is shown as the underlying data in FIGS. 6 and 9.

Figure 11:
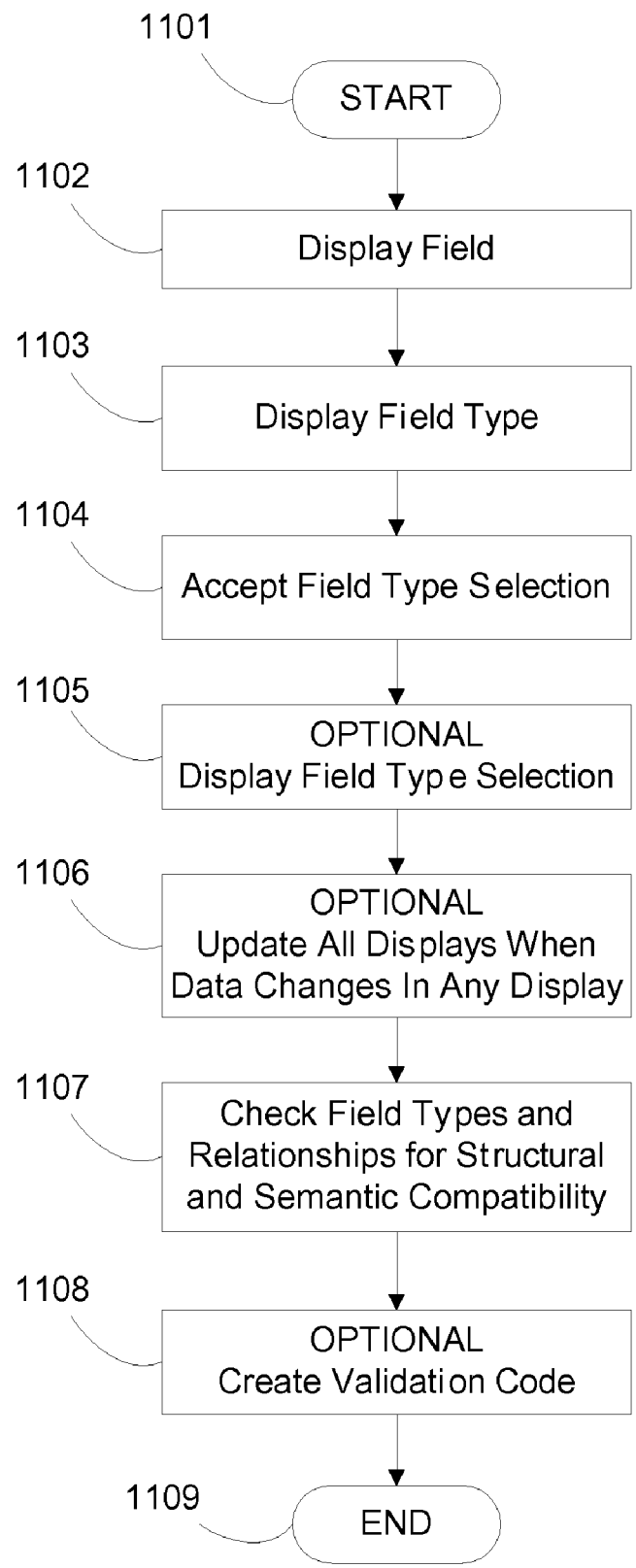
FIG. 11 is a flowchart that illustrates the manual schema generation process

FIG. 11 is a flowchart that illustrates the manual schema generation process. Processing starts at 1101. A field is displayed at 1102, the field may be input manually as in this figure, or imported (see FIG. 12). The field type associated with the field is displayed at 1103. The display may include a list view display and entity relationship diagram display or any other type of display. A field type selection is performed at 1104. The field type may be standard SQL or a custom type (see Tables 1 and 2). In the case of visual modes of operation, e.g., non-batch modes, the field type selection is displayed at 1105. Any other displays that are displaying the information, e.g., the combination of an entity relationship diagram or list view, then the other views are updated with the selection at 1106. The field types and relationships are checked for structural and semantic compatibility with the rules that are defined for the given target schema at 1107. (See FIG. 1 for a list of the types of structural and semantic checks performed). In addition, step 1107 may utilize the "Sample data generator" as shown in FIG. 1 to perform checks for semantics, structural inconsistencies, table and field conflicts and data integrity correctness by building sample test data to fit the target schema. The apparatus may create validation code at 1108 if so desired by the user, based on relations and limit values for example that are input by the user to allow entry of only acceptable values as desired. Processing ends at 1109.

Figure 12:
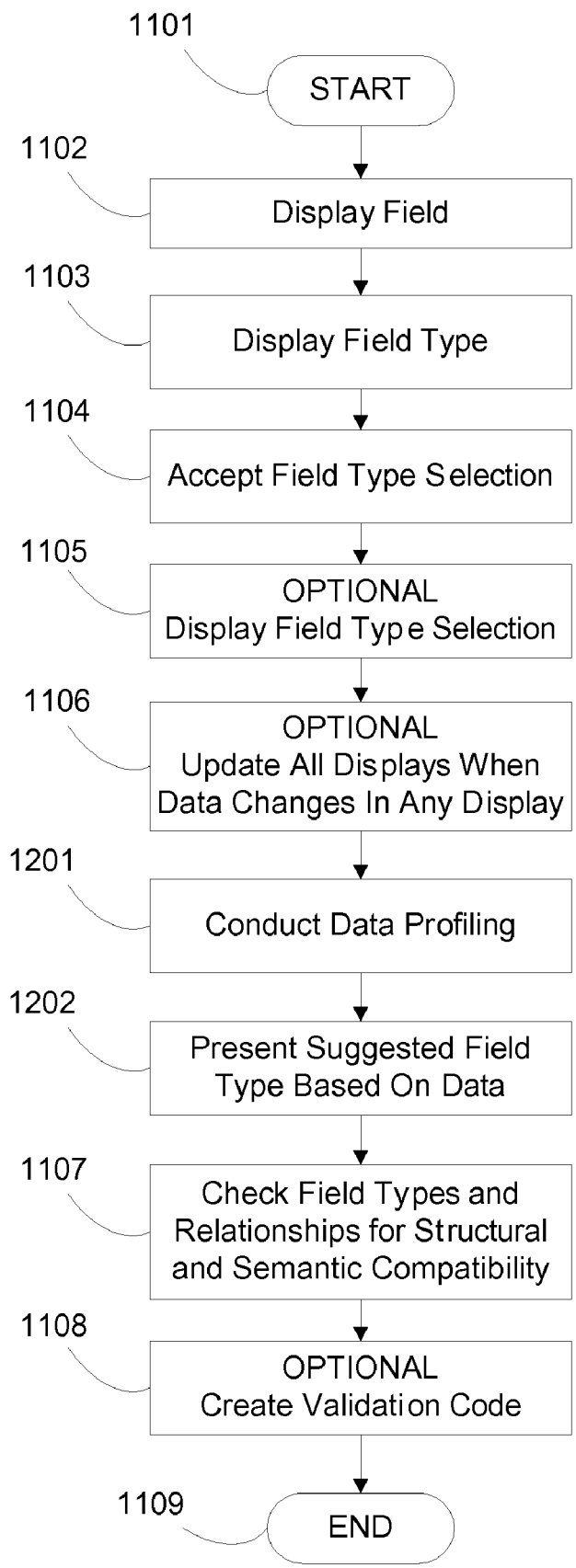
FIG. 12 is a flowchart that illustrates the import schema generation process.

FIG. 12 is a flowchart that illustrates the import schema generation process. Processing starts at 1101. A field is displayed at 1102, the field may be input manually as in this figure, or imported (see FIG. 12). The field type associated with the field is displayed at 1103. The display may include a list view display and entity relationship diagram display or any other type of display. A field type selection is performed at 1104. The field type may be standard SQL or a custom type (see Tables 1 and 2). In the case of visual modes of operation, e.g., non-batch modes, the field type selection is displayed at 1105. Any other displays that are displaying the information, e.g., the combination of an entity relationship diagram or list view, then the other views are updated with the selection at 1106. Data profiling is performed at 1201 to check for semantic problems, structural inconsistencies, table and field conflicts and data integrity correctness. The apparatus presents suggested field types based on data that populate the database at 1202. By optimizing the schema for the actual data that will be associated with the schema, the most efficient schema for the data is thus created. If data patterns change over time, then the schema may be altered and optimized based on observed data at any time. The field types and relationships are checked for structural and semantic compatibility with the rules that are defined for the given target schema at 1107. (See FIG. 1 for a list of the types of structural and semantic checks performed). The apparatus may create validation code at 1108 if so desired by the user, based on relations and limit values for example that are input by the user to allow entry of only acceptable values as desired. Processing ends at 1109.

While the invention herein disclosed has been described by means of specific embodiments and applications thereof, numerous modifications and variations could be made thereto by those skilled in the art without departing from the scope of the invention set forth in the claims.

What is claimed is:

1. A tangible memory medium of a computer encoded with computer readable instruction code for generating an efficient database schema, said computer readable instruction code configured to:

obtain an original schema corresponding to an original database, said original schema comprising a field and an original field type selection;

perform rule-based structural and semantic checking comprising checking fields and relationships of said original schema for data integrity based on at least one of nested structure denormalization, lookup tables that can hold an unlimited number of records, inspection of taxonomy defined on a non-main table, and augmenting a particular table of said original schema;

determine at least one suggested field type based on said checking, wherein said at least one suggest field type is selected from a first field type of qualifier type, wherein said first field type of said qualifier type is a lookup into the records of a qualified table of a database comprising sparse data placed in said qualified table and eliminated from a primary table of said database, a second field type of multi-lingual type, wherein said second field type of multi-lingual type is associated with a targeted audience, wherein only data that is different with respect to a second audience is entered for said targeted audience in said database, and unentered values are inherited form data entered for said second audience in said database, and a third field type of calculation type, wherein said third field type of calculation type is configured to store calculated values of said third field type in memory at runtime and not in said database;

accept a field type selection from said first field type, said second field type, and said third field type, wherein said field type selection is different from said original field type selection;

generate a modified schema comprising said field and said field type selection based on said original schema and said at least one suggested field type, wherein said modified schema conforms to requirements of a master data management schema; and load said modified schema into a desired database, wherein said desired database comprises data from said original database, wherein said data is optimized based on said field type selection.

2. The tangible memory medium of claim 1, wherein said computer readable instruction code is further configured to:

display said field type selection in a list view and in an entity relationship diagram wherein said field type selection in said list view changes when said field type selection changes in said entity relationship diagram and wherein said field type selection in said entity relationship diagram changes when said field type selection in said list view changes.

3. The tangible memory medium of claim 1, wherein said computer readable instruction code is further configured to:

accept a manually entered field, wherein said modified schema comprises said manually entered field.

4. The tangible memory medium of claim 1, wherein said computer readable instruction code is further configured to:

import at least one field from an external data source.

5. The tangible memory medium of claim 1, wherein said computer readable instruction code is further configured to:

accept a field relationship;

check said field type and said field relationship for structural compatibility and semantic compatibility with at least one rule.

6. The tangible memory medium of claim 1, wherein said computer readable instruction code is further configured to:

conduct data profiling to validate said modified schema against sample data derived from an external data source and wherein said data profiling checks for semantics, structural inconsistencies, table and field conflicts and data integrity correctness.

7. The tangible memory medium of claim 1, wherein said computer readable instruction code is further configured to:

obtain at least one data record from an external database;

check said at least one data record for structural compatibility and semantic compatibility with at least one rule; and, present a suggested field type to a user for at least one field type in said at least one data record based on data in said at least one data record wherein said suggested field type is based on a rule that utilizes a relation between a plurality of fields in said at least one data record.

8. The tangible memory medium of claim 1, wherein said computer readable instruction code is further configured to:

create a validation code set for validation of future data values that are attempted to be entered into said field.

9. A computer implemented process for modifying a schema implemented on a computer programmed to execute computer code comprising instructions to:

obtain an original schema corresponding to an original database, said original schema comprising a field and an original field type selection;

perform rule-based structural and semantic checking comprising checking fields and relationships of said original schema for data integrity due to based on at least one of nested structure denormalization, lookup tables that can hold an unlimited number of records, inspection of taxonomy defined on a non-main table, and augmenting a particular table of said original schema;

determine at least one suggested field type based on said checking, wherein said at least one suggest field type is selected from a first field type of qualifier type, wherein said first field type of said qualifier type is a lookup into the records of a qualified table of a database comprising sparse data placed in said qualified table and eliminated from a primary table of said database, a second field type of multi-lingual type, wherein said second field type of multi-lingual type is associated with a targeted audience, wherein only data that is different with respect to a second audience is entered for said targeted audience in said database, and unentered values are inherited form data entered for said second audience in said database, and a third field type of calculation type, wherein said third field type of calculation type is configured to store calculated values of said third field type in memory at runtime and not in said database;

accept a field type selection from said first field type, said second field type, and said third field type, wherein said field type selection is different from said original field type selection;

generate a modified schema comprising said field and said field type selection based on said original schema and said at least one suggested field type, wherein said modified schema conforms to requirements of a master data management schema; and load said modified schema into a desired database, wherein said desired database comprises data from said original database, wherein said data is optimized based on said field type selection.

10. The computer implemented process of claim 9 wherein said computer readable program code is further configured to:

accept a field relationship; and check said field type and said field relationship for structural compatibility and semantic compatibility with at least one rule wherein said check comprises inspection of data integrity due to nested structure denormalization and wherein said check further comprises inspection of lookup tables that can hold an unlimited number of records and wherein said check further comprises inspection of taxonomy defined on a non-main table and wherein said check further comprises inspection of the existence of one main table.

11. The computer implemented process of claim 9 wherein said computer readable instruction code is further configured to:

display said field type selection in a list view and in an entity relationship diagram wherein said field type selection in said list view changes when said field type selection changes in said entity relationship diagram and wherein said field type selection in said entity relationship diagram changes when said field type selection in said list view changes.

12. The computer implemented process of claim 9 wherein said computer readable instruction code is further configured to:

accept a manually entered field, wherein said modified schema comprises said manually entered field.

13. The computer implemented process of claim 9 wherein said computer readable instruction code is further configured to:

import at least one field from an external data source.

14. The computer implemented process of claim 9 wherein said computer readable instruction code is further configured to:

import at least one field defined with extensible markup language schema definition (XSD) from an external data source.

15. The computer implemented process of claim 9 wherein said computer readable instruction code is further configured to:

conduct data profiling to validate said modified schema against sample data derived from an external data source and wherein said data profiling checks for semantics, structural inconsistencies, table and field conflicts and data integrity correctness.

16. The computer implemented process of claim 9 wherein said computer readable instruction code is further configured to:

obtain at least one data record from an external database;

check said at least one data record for structural compatibility and semantic compatibility with at least one rule; and, present a suggested field type to a user for at least one field type in said at least one data record based on data in said at least one data record wherein said suggested field type is based on a rule that utilizes a relation between a plurality of fields in said at least one data record.

17. The computer implemented process of claim 9 wherein said computer readable instruction code is further configured to:

create a validation code set for validation of future data values that are attempted to be entered into said field.

* * * * *